(12) United States Patent
Yang et al.

(10) Patent No.: US 9,992,692 B2
(45) Date of Patent: Jun. 5, 2018

(54) NETWORK NODE, A MOBILITY MANAGEMENT NODE AND METHODS THEREIN FOR HANDLING GTP TUNNEL FAILURES IN A RADIO COMMUNICATIONS NETWORK

(71) Applicant: Telefonaktieboiaget LM Ericsson (publ), Stockholm (SE)

(72) Inventors: Yong Yang, Kållered (SE); Qian Chen, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/515,662

(22) PCT Filed: Sep. 28, 2015

(86) PCT No.: PCT/EP2015/072215
§ 371 (c)(1),
(2) Date: Mar. 30, 2017

(87) PCT Pub. No.: WO2016/050673
PCT Pub. Date: Apr. 7, 2016

(65) Prior Publication Data
US 2017/0303145 A1 Oct. 19, 2017

Related U.S. Application Data

(60) Provisional application No. 62/059,430, filed on Oct. 3, 2014.

(51) Int. Cl.
*H04W 4/00* (2018.01)
*H04W 24/02* (2009.01)
(Continued)

(52) U.S. Cl.
CPC ......... *H04W 24/02* (2013.01); *H04W 76/041* (2013.01); *H04W 76/22* (2018.02); *H04W 24/04* (2013.01)

(58) Field of Classification Search
CPC combination set(s) only.
See application file for complete search history.

(56) References Cited

U.S. PATENT DOCUMENTS 8,125,889 B2 * 2/2012 Hu .................. H04L 12/4633
370/216
9,398,625 B2 * 7/2016 Sadeh ................ H04W 76/021
(Continued)

OTHER PUBLICATIONS

International Search Report and Written Opinion issued in PCT/EP2015/072215, dated Dec. 11, 2015, 8 pages.
(Continued)

*Primary Examiner* — Frank Duong
(74) *Attorney, Agent, or Firm* — Sage Patent Group

(57) ABSTRACT

A method performed by a network node (110) for handling a GTP tunnel failure in a radio communications network (100) is provided. The network node (110) receives a release message from a mobility management node (150) for a wireless device (121) associated with the network node (110). The release message comprises information identifying at least one E-UT-RAN Radio Access Bearer, E-RAB, and information that the release message was caused by a DPRS Tunneling Protocol, GTP, error indication. The network node (110) also allocates one or more tunnel endpoint identifiers, TEIDs, for the at least one E-RAB identified in the received release message. Then, the network node (110) transmits a modification message to the mobility management node (150) to modify the at least one E-RAB identified in the received release message, said modification message comprising the allocated one or more TEIDs for the at least one E-RAB. A network node for handling a GTP tunnel
(Continued)

failure in a radio communications network (100) is also provided. A mobility management node (150) and a method therein for handling a GTP tunnel failure in a radio communications network (100) is also provided.

11 Claims, 5 Drawing Sheets

(51) Int. Cl.
    *H04W 76/04*     (2009.01)
    *H04W 24/04*     (2009.01)

(56) References Cited

U.S. PATENT DOCUMENTS

| | | | | |
|---|---|---|---|---|
| 2010/0322068 | A1* | 12/2010 | Grahn | H04W 76/021 370/217 |
| 2015/0173121 | A1* | 6/2015 | Miklos | H04W 76/046 370/329 |

OTHER PUBLICATIONS

"3rd Generation Partnership Project: Technical Specification Group Core Network and Terminals; Restoration procedures; (Release 12)", 3GPP Standard; 3GPP TS 23.007, 3rd Generation Partnership Project (3GPP), Mobile Competence Centre; 650, Route Des Lucioles; F-06921 Sophia-Antipolis Cedex, France, vol. CT WG4, No. V12.6.0, Sep. 30, 2014, XP050926329, 91 pages.

Ericsson: "LS on S1-U tunnel switch for Dual Connectivity"; 3GPP Draft; R3-141558_C4-141621, Meeting #85; 3rd Generation Partnership Project (3GPP), Mobile Competence Centre; 650, Route Des Lucioles; F-06921 Sophia-Antipolis Cedex, France, vol. RAN WG3, No. Dresden, Germany, Aug. 17, 2014, XP050796408, 2 pages.

"3rd Generation Partnership Project: Technical Specification Group Services and System Aspects; General Packet Radio Service (GPRS) enhancements for Evolved Universal Terrestrial Radio Access Network (E-UTRAN) access; (Release 12)"; 3GPP TS 23.401, 3rd Generation Partnership Project (3GPP), Mobile Competence Centre; 650, Route Des Lucioles; F-06921 Sophia-Antipolis Cedex, France; No. V12.6.0, Sep. 2014, 306 pages.

"3rd Generation Partnership Project: Technical Specification Group Core Network and Terminals; 3GPP Evolved Packet System (EPS); Evolved General Packet Radio Service (GPRS) Tunneling Protocol for Control plane (GTPv2-C); Stage 3; (Release 12)"; 3GPP TS 29.274, 3rd Generation Partnership Project (3GPP), Mobile Competence Centre; 650, Route Des Lucioles; F-06921 Sophia-Antipolis Cedex, France; No. V12.6.0, Sep., 2014, 313 pages.

"3rd Generation Partnership Project: Technical Specification Group Radio Access Network; Evolved Universal Terrestrial Radio Access Network (E-UTRAN); S1 Application Protocol (S1AP); (Release 12)"; 3GPP TS 36.413, 3rd Generation Partnership Project (3GPP), Mobile Competence Centre; 650, Route Des Lucioles; F-06921 Sophia-Antipolis Cedex, France; No. V12.3.0, Sep. 2014, 290 pages.

"3rd Generation Partnership Project: Technical Specification Group Radio Access Network; Evolved Universal Terrestrial Radio Access Network (E-UTRAN); Overall description; Stage 2; (Release 12)"; 3GPP TS 36.300, 3rd Generation Partnership Project (3GPP), Mobile Competence Centre; 650, Route Des Lucioles; F-06921 Sophia-Antipolis Cedex, France; No. V12.3.0, Sep. 2014, 215 pages.

Ericsson: "Handling of GTP-U-Error Indication for Dual Connectivity", 3GPP; TSG-RAN WG3 Meeting #85bis, R3-142454, Discussions & Approval, Oct. 6-10, 2014, Shanghai, China, 2 pages.

RAN3: "Reply LS on S1-U tunnel switch for Dual Connectivity", 3GPP; TSG-RAN WG3 Meeting #85, R3-142093, Aug. 18-22, 2014, Dresden, Germany, 1 page.

\* cited by examiner

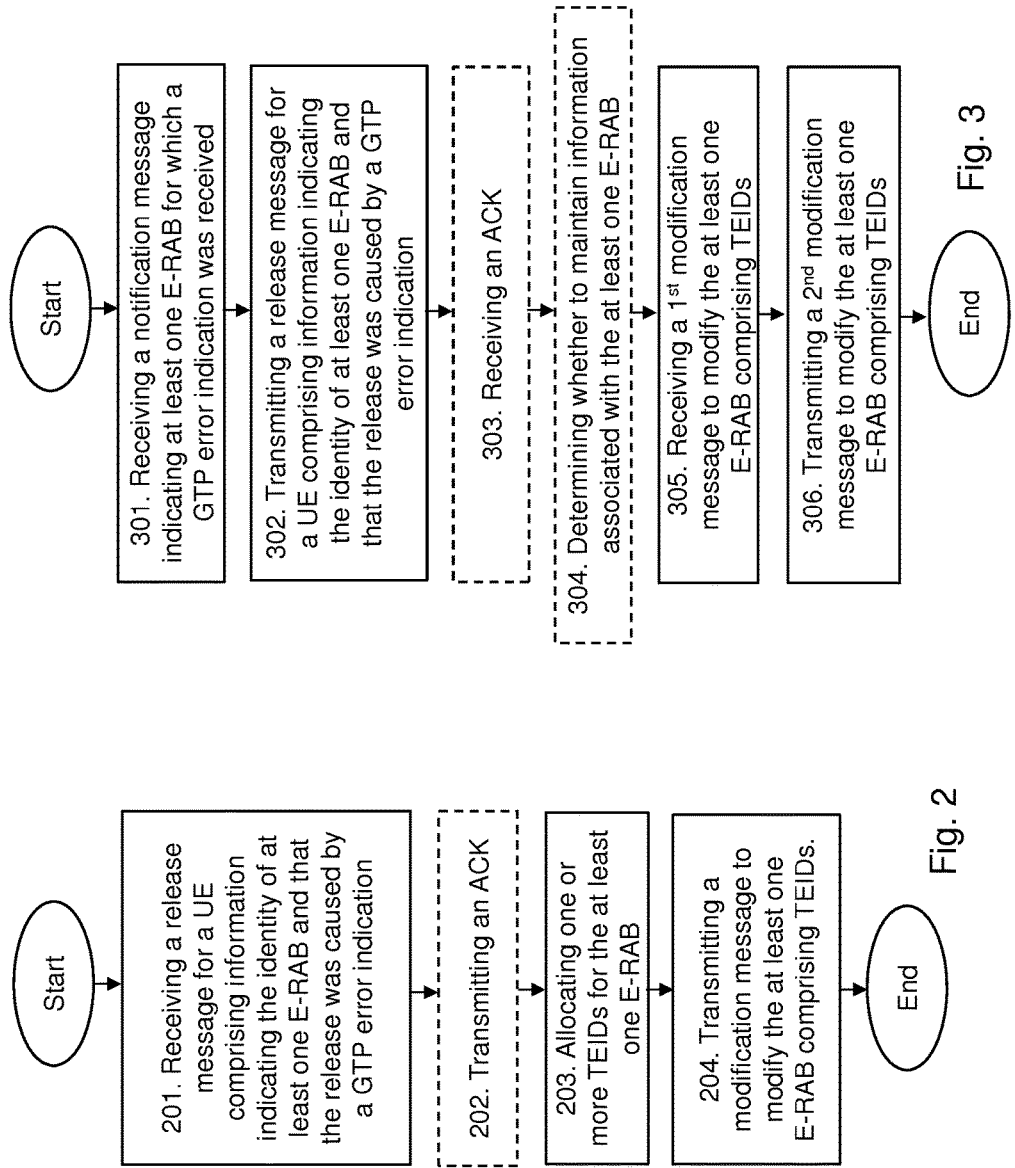

NETWORK NODE, A MOBILITY MANAGEMENT NODE AND METHODS THEREIN FOR HANDLING GTP TUNNEL FAILURES IN A RADIO COMMUNICATIONS NETWORK

CROSS REFERENCE TO RELATED APPLICATION

This application is a 35 U.S.C. § 371 National Stage of International Patent Application No. PCT/EP2015/072215, filed Sep. 28, 2015, which claims priority to U.S. Application No. 62/059,430, filed Oct. 3, 2014. The above identified applications are incorporated by reference.

TECHNICAL FIELD

Embodiments herein relate to signaling in a radio communications network. In particular, embodiments herein relate to signaling following GTP tunnel failures in a radio communication network. A network node, a mobility management node and methods therein for handling a GTP tunnel failure in a radio communications network is provided.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station or network node, e.g. a radio base station, RBS, which in some networks may also be referred to as, for example, "NodeB", "eNB" or "eNodeB".

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations/network nodes connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network.

As such, the Radio Access Network, RAN, of an EPS has an essentially flat architecture comprising radio base station nodes without reporting to RNCs.

In Dual Connectivity, DC, a communication device may be served by two or more network nodes. These are commonly referred to as main network node, MeNB, and secondary network nodes, SeNB. They may also be referred to as primary and secondary, or anchor and booster. The communication device is here configured with a Primary Component Carrier, PCC, from both MeNB and SeNB. The PCell from MeNB and SeNB are referred to as PCell and PSCell, respectively. The PCell and PSCell typically operate the communication device independently. The communication device may also be configured with one or more Secondary CCs, SCCs, from each of MeNB and SeNB. The corresponding secondary serving cells served by MeNB and SeNB are referred to as SCell. The communication device operating in DC typically has separate transmissions/receptions, TX/RX, for each of the connections with MeNB and SeNB. This allows the MeNB and SeNB to independently configure the communication device with one or more procedures, such as, e.g. radio link monitoring (RLM), DRX cycle, etc., on their PCell and PSCell, respectively. More specifically DC is a mode of operation of the communication device in RRC_CONNECTED state. In 3GPP TS 36.300, version 12.3.0, two options are defined for dual connectivity as follows. First, a "Secondary Cell Group (SCG) bearer" option is specified, which enables changing the U-plane termination point in the E-UTRAN by means of S1-MME signaling without changing the S1-MME termination point. Secondly, a "Split bearer" option is specified, wherein the "split bearer" in the E-UTRAN is transparent to the core network entities (e.g. MME, S-GW, etc.).

DC may improve the per-user throughput and would be of interest to operators and users.

In the existing 3GPP TS 23.007, version 12.6.0, there is a requirement for when an SGW receives a GTP error indication from an eNB, as follows:

"For an 'Active' mode UE having a user plane connection with an eNB, i.e. SGW has F-TEIDs assigned by eNB for user plane for the UE, when the SGW receives a GTP Error Indication for a Bearer Context from an eNodeB, the SGW should not delete the associated Bearer Context but delete all the eNodeB GTP-U tunnel TEIDs for this UE and sends a Downlink Data Notification message to the MME (the complete behaviour is specified in clause 22). Then the SGW starts buffering downlink packets received for this UE.

Correspondingly, the requirements for the MME are described in clause 22 of the existing 3GPP TS 23.007, version 12.6.0, as follows:

"If the UE is in CONNECTED state, upon receipt of the Downlink Data Notification message, the MME shall perform S1 Release procedure and perform Network Triggered Service Request procedure as specified in 3GPP TS 23.401 (version 12.6.0)."

However, this procedure may lead to significant signaling in the radio communications network. In particular, in case the nodes in the radio communications network are operating in a Dual Connectivity, DC, mode. Hence, an improved way of signaling in the radio communications network is needed.

SUMMARY

It is an object of embodiments herein to improve signaling in a radio communications network.

According to a first aspect of embodiments herein, the object is achieved by providing a method performed by a network node for handling a GTP tunnel failure in a radio communications network. The method comprises receiving a release message from a mobility management node for a User Equipment, UE, associated with the network node, said release message comprising information identifying at least one E-UTRAN Radio Access Bearer, E-RAB, and information indicating that the release message was caused by a GPRS Tunneling Protocol, GTP, error indication. The method also comprises updating or allocating one or more tunnel end-point identifiers, TEIDs, for the at least one E-RAB identified in the received release message. Further, the method comprises transmitting a modification message to the mobility management node (150) to modify the at least one E-RAB identified in the received release message, said modification message comprising the allocated one or more TEIDs for the at least one E-RAB.

According to a second aspect of embodiments herein, the object is achieved by providing a network node for handling a GTP tunnel failure in a radio communications network. The network node is configured to receive a release message from a mobility management node, MME, for a User Equipment, UE, associated with the network node, said release message comprising information indicating at least one E-UTRAN Radio Access Bearer, E-RAB, identifier and that the release message was caused by a GPRS Tunneling Protocol, GTP, error indication. Also, the network node is configured to update or allocate one or more tunnel end-point identifiers, TEIDs, for the at least one E-RAB identified in the received release message. Further, the network node is configured to transmit a modification message to the mobility management node (150) to modify the at least one E-RAB identified in the received release message, said modification message comprising the allocated one or more TEIDs for the at least one E-RAB.

According to a third aspect of embodiments herein, the object is achieved by method performed by a mobility management node, MME, for handling a GTP tunnel failure in a radio communications network. The method comprises receiving a notification message from a serving gateway, SGW, serving a network node identifying at least one E-UTRAN Radio Access Bearer, E-RAB, for which a GPRS Tunneling Protocol, GTP, error indication was received. The method also comprises transmitting a release message for a User Equipment, UE, associated with the network node, said release message comprising information identifying the at least one E-UTRAN Radio Access Bearer, E-RAB, and information indicating that the release message was caused by a GPRS Tunneling Protocol, GTP, error indication. Further, the method comprises receiving a first modification message from the network node to modify the at least one E-RAB identified in the release message, said first modification message comprising the allocated one or more TEIDs for the at least one E-RAB. Also, the method comprises transmitting a second modification message to the SGW to modify the at least one E-RAB identified in the received notification message, said second modification message comprising the allocated one or more TEIDs received in the first modification message.

According to a fourth aspect of embodiments herein, the object is achieved by providing a mobility management node for handling a GTP tunnel failure in a radio communications network. The mobility management node is configured to receive a notification message from a serving gateway, SGW, serving a network node identifying at least one E-UTRAN Radio Access Bearer, E-RAB, for which a GPRS Tunneling Protocol, GTP, error indication was received. The mobility management node is also configured to transmit a release message for a User Equipment, UE, associated with the network node, said release message comprising information identifying the at least one E-UTRAN Radio Access Bearer, E-RAB, and information indicating that the release message was caused by a GPRS Tunneling Protocol, GTP, error indication. The mobility management node is further configured to receive a first modification message from the network node to modify the at least one E-RAB identified in the release message, said first modification message comprising the allocated one or more TEIDs for the at least one E-RAB. Also, the mobility management node is configured to transmit a second modification message to the SGW to modify the at least one E-RAB identified in the received notification message, said second modification message comprising the allocated one or more TEIDs for the at least one E-RAB received in the first modification message.

By having the network node and the MME configured as described above, an improvement, or proper optimization, of the signaling in the radio communications network for the single bearer case in case of a GTP tunnel failure is achieved. Furthermore, in case of Dual Connectivity, DC, further improvement is achieved for the signaling in the radio communications network in case of a GTP tunnel failure, since network signaling between the network nodes involved in the DC may be significantly reduced. Hence, signaling in the radio communications network is improved.

BRIEF DESCRIPTION OF THE DRAWINGS

Embodiments will now be described in more detail in relation to the enclosed drawings.

FIG. 2 is a flowchart depicting embodiments of a method in a network node, FIG. 3 is a flowchart depicting embodiments of a method in a mobility management node.

DETAILED DESCRIPTION

Figure 1:
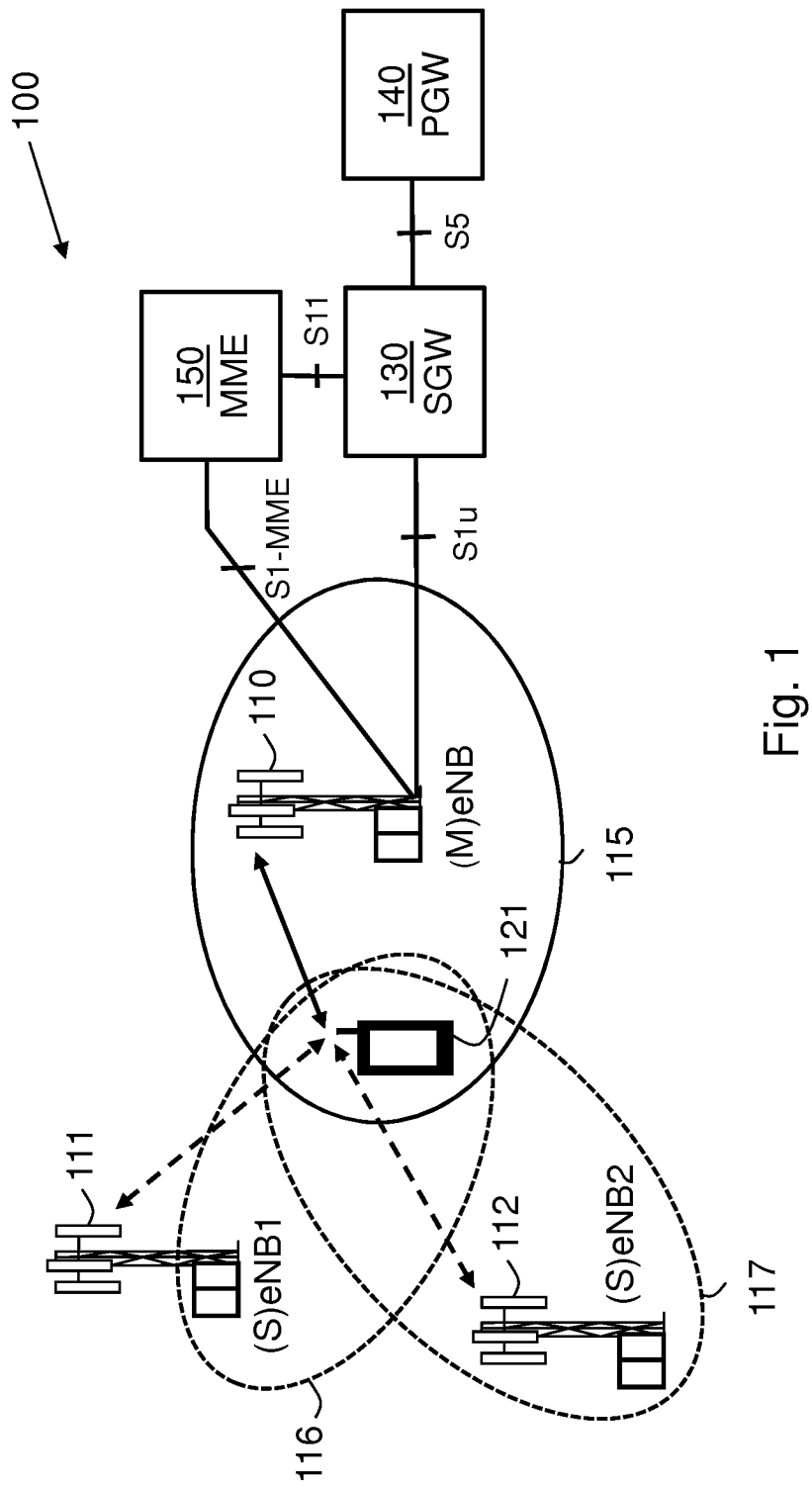
FIG. 1 is a schematic block diagram illustrating embodiments of a network node and a mobility management node in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a radio communications network 100 in which embodiments herein may be implemented. In some embodiments, the radio communications network 100 may be a wireless communications network such as a Long Term Evolution (LTE) network. Although, the radio communication network 100 is exemplified herein as an LTE network, the radio communications network 100 may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system.

The radio communications system 100 comprises a network node 110. The network node 110 serves at least one cell 115. The network node 110 may correspond to any type of radio network node or any network node, which communicates with a UE and/or with another network node, such as, e.g. be a base station, a radio base station, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communication network 100 is also broadcasted in the cell 115. The network node 110 communicates over the air or radio interface operating on radio frequencies with the UEs within range of the network node 110.

In FIG. 1, a UE 121 is located within the cell 115. The UE 121 is configured to communicate within the radio communications network 100 via the network node 110 over a radio link 131 when present in the cell 115 served by the network node 110. The communication device 121 may refer to any type of communication device or wireless device communicating with a network node and/or with another communication device in a cellular, mobile or radio communication network or system. Examples of such a UE are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

The radio communications system 100 may comprises a serving gateway, SGW 130, and a mobility management node 150, e.g. an MME, serving the communication device 121. The radio communications system 100 may also comprise a Packet Data Network, PDN, gateway, PGW 140, which may provide connectivity to external packet data networks from/to the UE 121.

According to some embodiments, and as shown in FIG. 1, the radio communications system 100 may further comprises a second and a third network node 111, 112. The network node 111, 112 serves at least one cell 116, 117. The second and third network node 111, 112 may be configured to serve the communication device 121 in the at least one cell 116, 117, i.e. secondary cells, when operating in Dual Connectivity, DC, mode.

As part of the developing of the embodiments described herein, a problem will first be identified and discussed. For example, when a dual connectivity feature is enabled in a radio communication network, especially when an SCG bearer option is used, a SGW receiving a GTP error indication from a SeNB, with the existing requirement, the MME will initiate an S1 release procedure. This will delete the whole UE context in the network node. This also means that the UE context will have to be rebuilt for the network node, e.g. upon a subsequent Service Request in response to a paging request. However, this taking down or deletion of the whole UE context and re-establishment of new UE context, involves much signaling between the MeNB and the SeNB and also much signaling at the network level. It should also be noted that receiving a GTP error indication from a SeNB only means that there are some problems in SeNB, hence the MeNB may operate normally. Therefore, to bring down the whole UE context for all network nodes is not particularly efficient. These issues are addressed by the embodiments presented herein.

Example of embodiments of a method performed by a network node 110 for handling a GTP tunnel failure in a radio communications network 100, will now be described with reference to the flowchart depicted in FIG. 2. FIG. 2 illustrates an example of actions or operations which may be taken by the network node 110.

Action 201

First, the network node 110 receives a release message from a mobility management node 150 for a User Equipment, UE 121, associated with the network node 110, said release message comprising information identifying at least one E-UTRAN Radio Access Bearer, E-RAB, and information indicating that the release message was caused by a GPRS Tunneling Protocol, GTP, error indication. Here, it should be noted that information indicating that the release message was caused by a GTP error indication also means information that indicates to the network node 110 that the release message was sent because the downlink data path for the E-RAB is broken, i.e. failed. This may be the case when, for example, the SGW 130 has received at least a GTP error indication. In this case, the MME 150 may, for example, be informed by a GTP message Downlink Data Notification message, which may comprise a cause code indicating that the DDN is triggered due to receiving GTP error indication in the SGW 130.

According to some embodiments, the release message may be a UE context release command as part of an S1 release procedure. Alternatively, the release message may be an E-RAB release command as part of an E-RAB release procedure. Optionally, the release message may be a message forming a part of an S1AP procedure and/or a specifically dedicated message for the release in the wireless communications network.

Action 202

In this optional action, the network node 110 transmits a response message to the mobility management node 150 in response to the received release message. The response message may comprise information indicating that the network node 110 supports the at least one E-RAB identified in the received release message and acknowledges that the release message was caused by a GTP error indication. Here, it should be noted that supporting the at least one E-RAB means that the network node 110 supports the re-allocation of resources, such as, e.g. one or more tunnel end-point identifiers, TEIDs, for the at least one E-RAB.

In some embodiments, the response message may be a UE context release complete message as part of an S1 release procedure. Alternatively, the response message may be an E-RAB release response as part of an E-RAB release procedure. Optionally, the response message may be a message forming a part of an S1AP procedure and/or a specifically dedicated message for the response in the wireless communications network.

Action 203

In this action, the network node 110 allocates one or more tunnel end-point identifiers, TEIDs, for the at least one E-RAB identified in the received release message. In other words, the network node 110 may update one or more tunnel end-point identifiers, TEIDs, for the at least one E-RAB identified in the received release message.

Action 204

In this action, the network node 110 transmits a modification message to the mobility management node 150 to modify the at least one E-RAB identified in the received release message. The modification message comprise the allocated one or more TEIDs for the at least one E-RAB. In some embodiments, the modification message may comprise all TEIDs including the updated or newly allocated one or more TEIDs. In some embodiments, the modification message is an E-RAB Modification Indication.

Example of embodiments of a method performed by mobility management node 150, e.g. an MME, for handling a GTP tunnel failure in a radio communications network 100, will now be described with reference to the flowchart depicted in FIG. 3. FIG. 3 illustrates an example of actions or operations which may be taken by the mobility management node 150.

Action 301

First, the mobility management node 150 receives a notification message from a serving gateway, SGW 130, serving a network node identifying at least one E-UTRAN Radio Access Bearer, E-RAB, for which a GPRS Tunneling Protocol, GTP, error indication was received. In some embodiments, the notification message may be a Downlink Data Notification, DDN, message.

Action 302

In this action, the mobility management node 150 transmits a release message for a User Equipment, UE 121, associated with the network node 110, said release message comprising information identifying the at least one E-UTRAN Radio Access Bearer, E-RAB, and information indicating that the release message was caused by a GPRS Tunneling Protocol, GTP, error indication. Here, it should be noted that information indicating that the release message was caused by a GTP error indication also means information that indicates that the release message was sent because the downlink data path for the E-RAB is broken, i.e. failed. This may be the case when, for example, the SGW 130 has received at least a GTP error indication.

In some embodiments, the release message may be a UE context release command as part of an S1 release procedure. In some embodiments, the release message may be a E-RAB release command as part of an E-RAB release procedure.

Action 303

Optionally, the mobility management node 150 may according to some embodiments receive a response message, from the network node 110, comprising information indicating that the network node 110 supports the at least one E-RAB identified in the transmitted release message and acknowledges that the release message was caused by a GTP error indication. Here, it should be noted that supporting the at least one E-RAB means that the network node 110 supports the re-allocation of resources, such as, e.g. one or more tunnel end-point identifiers, TEIDs, for the at least one E-RAB.

In case the release message was a UE context release command as part of an S1 release procedure, the response message may be a UE context release complete message as part of the S1 release procedure. Alternatively, in case the release message was a E-RAB release command as part of an E-RAB release procedure, the response message may be a E-RAB release response as part of the E-RAB release procedure.

Action 304

In case a response message was received, the mobility management node 150 may determine whether the S1 association, i.e. when a UE context release command is used as the release message, or the bearer context, i.e. when a E-RAB release command is used as the release message, associated with the at least one E-RAB identified in the transmitted release message need to be maintained in the mobility management node 150 in response to the received response message.

In other words, the latter means also that the mobility management node 150 may comprise determining whether information associated with the at least one E-RAB identified in the transmitted release message, more specifically, the resource or TEIDs, need to be maintained in the mobility management node in response to the received response message. For example, based on the information set in the received response message in Action 303, such as, e.g. that the network node 110 supports the at least one E-RAB, i.e. supports the re-allocation of resources or TEIDs for the at least one E-RAB, the mobility management node 150 may or may not maintain information in the mobility management node 150 that is associated with the at least one E-RAB, e.g. the resource or TEIDs associated with the at least one E-RAB.

It should be also noted that the information associated with the at least one E-RAB identified in the release message may be an S1 association, when the release message is a UE context release command and the response message is a UE context release complete message. Furthermore, it should here also be noted that the information associated with the at least one E-RAB identified in the release message may be a bearer context, when the release message is an E-RAB release command and the response message is an E-RAB release response.

Action 305

First, the mobility management node 150 receives a first modification message from the network node 110 to modify the at least one E-RAB identified in the release message. The first modification message comprise the allocated one or more TEIDs for the at least one E-RAB. In some embodiments, the first modification message may comprise all TEIDs including the updated, or newly allocated, one or more TEIDs. In some embodiments, the first modification message may be an E-RAB Modification Indication.

Action 306

In this action, the mobility management node 150 transmits a second modification message to the SGW 130 to modify the at least one E-RAB identified in the received notification message. The second modification message comprise the allocated one or more TEIDs for the at least one E-RAB in the first modification message. In some embodiments, the second modification message comprise all TEIDs including the updated, or newly allocated, one or more TEIDs received in the first modification message. In some embodiments, the second modification message may be a Modify Bearer request.

Figure 4:
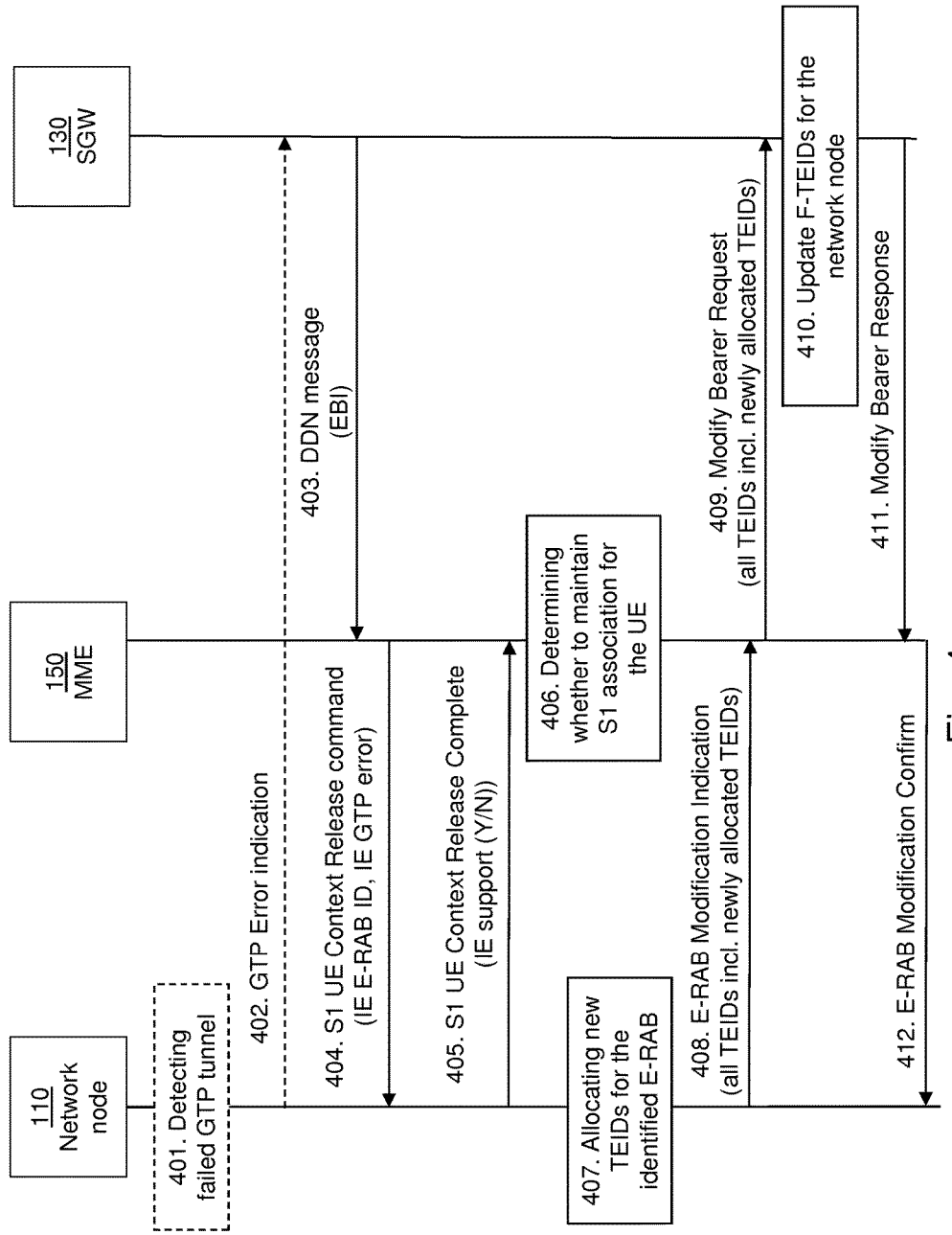
FIG. 4 is a signaling diagram depicting embodiments of methods in a network node and in a mobility management node.
Figure 5:
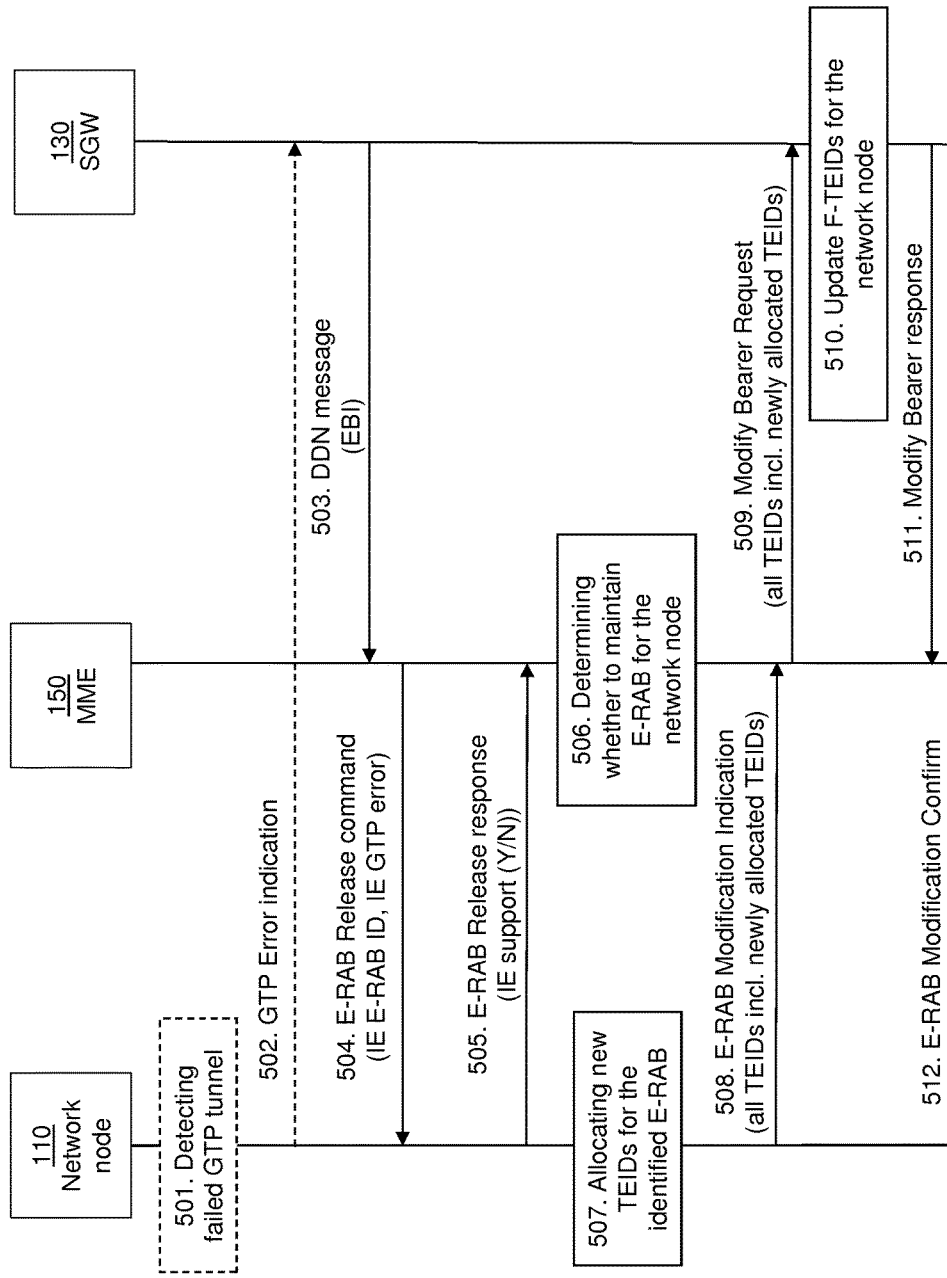
FIG. 5 is a signaling diagram depicting embodiments of methods in a network node and in a mobility management node.

More detailed embodiments are provided below with reference to the signaling diagrams of FIGS. 4-5.

Detailed embodiments of methods performed by the network node 110 and the mobility management node 150, will now be described with reference to the schematic signaling diagram depicted in FIG. 4. FIG. 4 is an illustrated example of actions or operations which may be taken by the involved nodes, and provides a mechanism to inform the network node 110, which owns the S1-MME signaling connection for the given UE 121, of the E-RAB identifier from which a GTP error indication is received.

Action 401

Optionally, it may be the network node 110 which detects the failed GTP tunnel, e.g. when sending user plane data of the UE 121. Alternatively, in case of operating in Dual Connectivity, DC, mode, this may be performed by one or the second or third network node 111, 112 configured to serve the communication device 121 in the secondary cells, i.e. cells 116, 117.

Action 402

After detecting the GTP tunnel failure, the network node 110, or any one of the second or third network node 111, 112, may transmit a GTP error indication message due to the mal-function, i.e. the GTP tunnel failure, to its serving gateway, SGW 130.

Action 403

When the SGW 130 receives the GTP error indication from the network node 110, or any one of the second or third network node 111, 112, the SGW 130 may send a Downlink Data Notification, DDN, with an EPS Bearer Identifier, EBI, to the MME 150 of the UE 121. The SGW 130 may also delete all GTP-U tunnel TEIDs of the network node 110 for the UE 121, e.g. the UE associated with the GTP error indication.

Action 404

When the MME 150 receives the DDN with EBI for a UE 121, which is in an active mode, the MME 150 may perform an S1 release procedure by transmitting a UE Context Release command to the network node 110 with a new IE E-RAB ID, i.e. to identify the E-RAB which the SGW 130 has indicated in the DDN, and another new IE indicating that this S1 release is due to the SGW 130 has received a GTP error indication from the E-RAB. In other words, the MME 150 sends a UE Context Release Command message with a new IE E-RAB ID and another new IE indicating that the S1 release is due to the SGW has received GTP error indication from the identified E-RAB to the network node 110.

Action 405

When the network node 110 receives the UE Context Release command from the MME 150, the network node 110 may respond with a UE Context Release complete message, for example, with a new flag, e.g. Yes(Y)/No(N), indicating whether the network node 110 support the new IEs in the received UE Context Release command. In other words, the network node 110 may send a UE Context Release Complete message with a new IE indicating if the network node 110 supports the new IEs in the command.

Action 406

When the MME 150 receives the UE Context Release complete message from the network node 110, the MME 150 may determine to maintain or keep the network node's S1AP association for the UE. This means that the MME 150 is information that the network node 110 will not continue with the S1 release procedure, i.e. based on the new flag in the UE Context Release complete message. This also means that the MME 150 will not perform a page of the UE 121.

Action 407

Then, when the network node 110 has responded with a UE Context Release complete message, the network node 110 will allocate new F-TEIDs, Fully Qualified-TEIDs, for the failed E-RAB. Also, the network node 110 may check the user plane for the UE 121. This means that if the network node 110 supports the new IEs in the command, the network node 110 may initiate an E-RAB modification procedure, with an existing S1 connection, to provide the MME 150 with a complete set of eNB F-TEIDs including the one for the failed E-RAB. However, if the network node 110 do not support the new IEs in the command, the network node 110 may just continue the S1 release procedure, e.g. as specified in 3GPP TS 23.401, version 12.6.0, and 3GPP TS 36.413, version 12.3.0. In this case, the MME 150 will page the UE 121 after S1 release, and the UE 121 will perform a Service Request procedure. This will then re-establish UE context for the UE 121 in the network node 110.

Action 408

When the network node 110 initiate the E-RAB Modification Indication procedure, e.g. for Dual Connectivity, DC, this may comprise transmitting a E-RAB Modification Indication message, comprising a complete set of eNB F-TEIDs including the one for the failed E-RAB, to the MME 150.

Action 409

When the MME 150 receives the E-RAB Modification Indication message from the network node 110 comprising a complete set of eNB F-TEIDs including the one for the failed E-RAB, the MME 150 may transmit a Modify Bearer Request message with the complete set of eNB F-TEIDs including the one for the failed E-RAB to the SGW 130.

Action 410

When the SGW 130 receives the E-RAB Modification Indication message from the MME 150 comprising a complete set of eNB F-TEIDs including the one for the failed E-RAB, the SGW 130 may update F-TEIDs for the network node 110.

Action 411

Then, the SGW 130 may send Modify Bearer Response message back to the MME 150.

Action 412

When the MME 150 receives the Modify Bearer Response message from the SGW 130, the MME 150 may transmit a E-RAB Modification Confirm message to the network node 110.

Detailed embodiments of methods performed by the network node 110 and the mobility management node 150, will now be described with reference to the schematic signaling diagram depicted in FIG. 5. FIG. 5 is an illustrated example of actions or operations which may be taken by the involved nodes, and provides a mechanism to inform the network node 110, which owns the S1-MME signaling connection for the given UE 121, of the E-RAB identifier from which a GTP error indication is received.

Action 501

Optionally, it may be the network node 110 which detects the failed GTP tunnel, e.g. when sending user plane data of the UE 121. Alternatively, in case of operating in Dual Connectivity, DC, mode, this may be performed by one or the second or third network node 111, 112 configured to serve the communication device 121 in the secondary cells, i.e. cells 116, 117.

Action 502

After detecting the GTP tunnel failure, the network node 110, or any one of the second or third network node 111, 112, may transmit a GTP error indication message due to the mal-function, i.e. the GTP tunnel failure, to its serving gateway, SGW 130.

Action 503

When the SGW 130 receives the GTP error indication from the network node 110, or any one of the second or third network node 111, 112, the SGW 130 may send a Downlink Data Notification, DDN, with an EPS Bearer Identifier, EBI, to the MME 150 of the UE 121. The SGW 130 may also delete all GTP-U tunnel TEIDs of the network node 110 for the UE 121, e.g. the UE associated with the GTP error indication.

Action 504

When the MME 150 receives the DDN with EBI for a UE 121, which is in an active mode, the MME 150 may perform E-RAB release procedure by sending E-RAB Release Command to the network node 110 with an E-RAB ID, i.e. to identify the E-RAB which the SGW 130 has indicated in the DDN, and another new IE indicating this E-RAB release is due to the fact that the SGW 130 has received GTP error indication from the E-RAB. In other words, the MME 150 may send, to the network node 110, an E-RAB Release Command message with E-RAB ID and another new IE indicating that the E-RAB release is due to that the SGW 130 has received a GTP error indication from the identified E-RAB.

Action 505

When the network node 110 receives the E-RAB Release Command message from the MME 150, the network node 110 may respond with a E-RAB Release Response message, for example, with a new flag, e.g. Yes(Y)/No(N), indicating whether the the network node 110 support the new IEs in the E-RAB Release command. In other words, the network node 110 may send an E-RAB Release Response message with a new IE indicating if the network node 110 supports the new IEs in the command.

Action 506

When the MME 150 receives the E-RAB Release Response message from the network node 110, the MME 150 may determine to maintain or keep the network node's bearer context for the UE 121. This means that the MME 150 is information that the network node 110 will not continue with the E-RAB release procedure towards UE 121, i.e. based on the new flag in the E-RAB Release Response message.

Action 507

Then, when the network node 110 has responded with a E-RAB Release Response message, the network node 110 will allocate new F-TEIDs, Fully Qualified-TEIDs, for the failed E-RAB. This may also include the network node 110 checking the user plane for the UE 121. Furthermore, the network node 110 will also not release its Uu connection towards the UE 121. This means that if the network node 110 supports the new IEs in the command, the network node 110 may initiate an E-RAB modification procedure to provide the MME 150 with a complete set of eNB F-TEIDs including the one(s) for the failed E-RAB. Here, the network node 110 may also ignore the NAS-PDU if MME 150 includes this in the E-RAB release Command. However, if the network node 110 do not support the new IEs in the command, it is required that the MME 150 stores the eNB F-TEIDs for the user plane for all bearer context(s) during previous a Service Request or user plane establishment procedure. The network node 110 may just continue with the E-RAB release procedure as specified in 3GPP TS 23.401 version 12.6.0 and 3GPP TS 36.413 version 12.3.0. The MME 150 may initiate a network requested dedicated bearer creation procedure of which the E-RAB setup procedure is part of. This may be performed in order to re-establish the E-RAB for the dedicated bearer after the E-RAB release procedure, i.e. if the default bearer is deactivated through the E-RAB release procedure, UE 121 may re-activate it through a PDN connectivity request. The MME 150 may thus receive new eNB F-TEIDs for the failed E-RAB, e.g. together with the rest of eNB F-TEIDs for the rest of the bearer contexts, and transmit a Modify Bearer Request message to the SGW 130.

Action 508

When the network node 110 initiate the E-RAB Modification Indication procedure, e.g. for Dual Connectivity, DC, this may comprise transmitting a E-RAB Modification Indication message, comprising a complete set of eNB F-TEIDs including the one for the failed E-RAB, to the MME 150.

Action 509

When the MME 150 receives the E-RAB Modification Indication message from the network node 110 comprising a complete set of eNB F-TEIDs including the one for the failed E-RAB, the MME 150 may transmit a Modify Bearer Request message with the complete set of eNB F-TEIDs including the one for the failed E-RAB to the SGW 130.

Action 510

When the SGW 130 receives the E-RAB Modification Indication message from the MME 150 comprising a complete set of eNB F-TEIDs including the one for the failed E-RAB, the SGW 130 may update F-TEIDs for the network node 110.

Action 511

Then, the SGW 130 may send Modify Bearer Response message back to the MME 150.

Action 512

When the MME 150 receives the Modify Bearer Response message from the SGW 130, the MME 150 may transmit a E-RAB Modification Confirm message to the network node 110.

One advantage with the embodiments herein is that it provides a mechanism to enhance the handling the scenario when the SGW 130 receives a GTP error indication from a network node 110, 111, 112, which e.g. saves a significant amount of network signaling among MeNB(s) and SeNB(s) when dual connectivity is in place. Another advantage is that methods enable a proper optimization for the single bearer fail case, i.e. when the radio communications network is not in a dual connectivity scenario.

Figure 6:
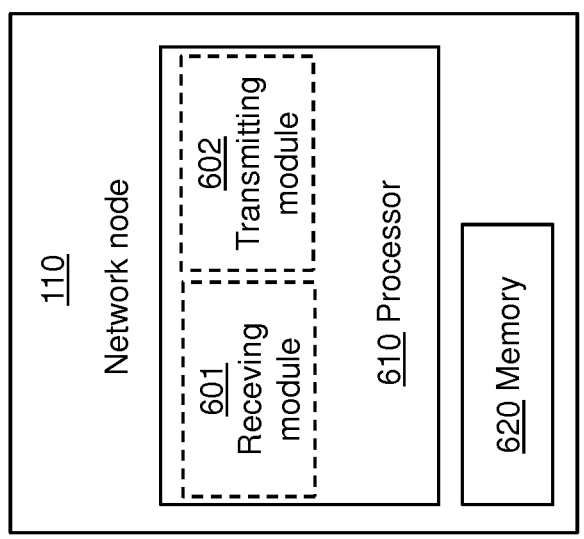
FIG. 6 is a schematic block diagram depicting embodiments of a network node.

To perform the method actions in a network node 110 for handling a GTP tunnel failure in a radio communications network 100, as described above in relation to FIGS. 2, 4 and 5, the network node 110 may comprise the following arrangement depicted in FIG. 6.

The network node 110 is configured to, e.g. by means of a receiving module 601 being configured to, receive a release message from a mobility management node, MME, for a User Equipment, UE, associated with the network node, said release message comprising information indicating at least one E-UTRAN Radio Access Bearer, E-RAB, identifier and that the release message was caused by a GPRS Tunneling Protocol, GTP, error indication. The receiving module 601 may also be referred to as a receiver, RX, or receiving unit. The receiving module 601 may also be a part of the processor 610, or processing module, of the network node 110. Also, the network node 110 is configured to, e.g. by means of the processor 610 being configured to, allocate one or more tunnel end-point identifiers, TEIDs, for the at least one E-RAB identified in the received release message. In other words, the network node 110 is configured to, e.g. by means of the processor 610 being configured to, update one or more tunnel end-point identifiers, TEIDs, for the at least one E-RAB identified in the received release.

The network node 110 is further configured to, e.g. by means of a transmitting module 602 being configured to, transmit a modification message to the mobility management node 150 to modify the at least one E-RAB identified in the received release message. The modification message comprise the allocated one or more TEIDs for the at least one E-RAB. In some embodiments, the modification message may comprise all TEIDs including the updated, or newly allocated, one or more TEIDs. The transmitting module 602 may also be referred to a transmitter, TX, or transmitting unit. The transmitting module 602 may also be a part of the processor 610, or processing module, of the network node 110.

Furthermore, in some embodiments, the network node 110 may be configured to, e.g. by means of the transmitting module 601 being configured to, transmit a response message to the mobility management node 150 in response to the received release message. The response message may comprise information indicating that the network node 110 supports the at least one E-RAB identified in the received release message and acknowledges that the release message was caused by a GTP error indication.

In some embodiments, the network node 110 may be a main network node, (M)eNB, operating in Dual Connectivity, DC, mode. This may also be referred to as a primary network node or anchor network node when the network node 110 is a network node operating in Dual Connectivity, DC, mode.

Figure 7:
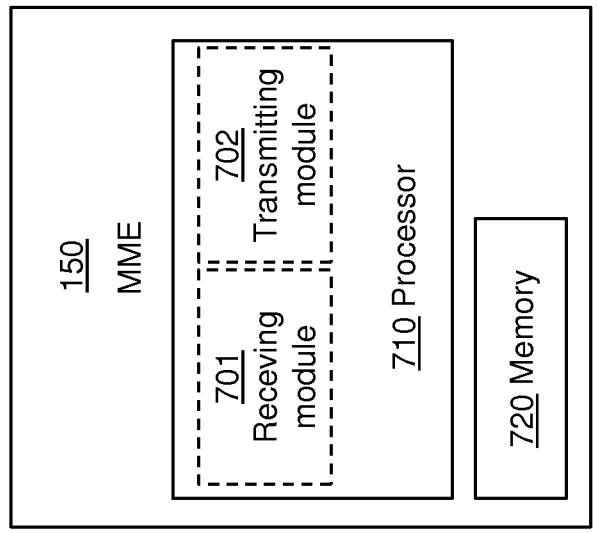
FIG. 7 is a schematic block diagram depicting embodiments of a mobility management node.

To perform the method actions in a mobility management node 150 for handling a GTP tunnel failure in a radio communications network 100, as described above in relation to FIGS. 3-5, the mobility management node 150 may comprise the following arrangement depicted in FIG. 7.

The mobility management node 150 is configured to, e.g. by means of a receiving module 701 being configured to, receive a notification message from a serving gateway, SGW 130, serving a network node identifying at least one E-UTRAN Radio Access Bearer, E-RAB, for which a GPRS Tunneling Protocol, GTP, error indication was received. In some embodiments, the notification message may be a Downlink Data Notification, DDN, message. The receiving module 701 may also be referred to as a receiver, RX, or receiving unit. The receiving module 701 may also be a part of the processor 710, or processing module, of the mobility management node 150.

Also, the mobility management node 150 is configured to, e.g. by means of a transmitting module 702 being configured to, transmit a release message for a User Equipment, UE, associated with the network node, said release message comprising information identifying the at least one E-UTRAN Radio Access Bearer, E-RAB, and information indicating that the release message was caused by a GPRS Tunneling Protocol, GTP, error indication. The transmitting module 702 may also be referred to a transmitter or transmitting unit. The transmitting module 702 may also be a part of the processor 710, or processing module, of the mobility management node 150.

Furthermore, mobility management node 150 is configured to, e.g. by means of the receiving module 701 being configured to, receive a first modification message from the network node 110 to modify the at least one E-RAB identified in the release message, said first modification message comprising all TEIDs including the updated or newly allocated one or more TEIDs. The mobility management node 150 is further configured to, e.g. by means of the transmitting module 702 being configured to, transmit a second modification message to the SGW 130 to modify the at least one E-RAB identified in the received notification message, said second modification message comprising all TEIDs including the updated or newly allocated one or more TEIDs received in the first modification message.

Furthermore, in some embodiments, the mobility management node 150 may be configured to, e.g. by means of the receiving module 701 being configured to, receive a response message, from the network node 110, comprising information indicating that the network node 110 supports the at least one E-RAB identified in the transmitted release message and acknowledges that the release message was caused by a GTP error indication.

In this case, according to some embodiments, the mobility management node 150 may also be further configured to, e.g. by means of the processor 710 being configured to, determine whether the S1 association, i.e. when a UE context release command is used as the release message, or the bearer context, i.e. when a E-RAB release command is used as the release message, associated with the at least one E-RAB identified in the transmitted release message needs to be maintained in the mobility management node in response to the received response message.

In other words, the latter also means that the mobility management node 150 may also be further configured to, e.g. by means of the processor 710 being configured to, determine whether information associated with the at least one E-RAB identified in the transmitted release message needs to be maintained in the mobility management node 150 in response to the received response message. In some embodiments, the information associated with the at least one E-RAB identified in the release message is an S1 association. Alternatively, the information associated with the at least one E-RAB identified in the release message is a bearer context.

The embodiments for handling a GTP tunnel failure in a radio communications network 100 may be implemented through one or more processors, such as, e.g. the processor 610 in the network node 110 depicted in FIG. 6 and the processor 710 in the mobility management node 150 depicted in FIG. 7, together with computer program code for performing the functions and actions of the embodiments therein. The program code mentioned above may also be provided as a computer program product, for instance in the form of a data carrier carrying computer program code or code means for performing the embodiments herein when being loaded into the processor 610 in the network node 110 and the processor 710 in the mobility management node 150, respectively. The computer program code may e.g. be provided as pure program code in the network node 110 and the mobility management node 150, or on a server and downloaded to the network node 110 and the mobility management node 150. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The network node 110 and the mobility management node 150 may further comprise a memory 620, 720, respectively, which may be referred to or comprise one or more memory modules or units. The memory 620, 720 may be arranged to be used to store executable instructions and data to perform the methods described herein when being executed in the network node 110 and the mobility management node 150, respectively. Those skilled in the art will also appreciate that the processors 610, 710 and their respective memories 620, 720 described above may refer to a combination of analog and digital circuits, and/or one or more processors configured with software and/or firmware, e.g. stored in the memory 620, 720, that when executed by the one or more processors such as the processors 610, 710 perform the methods as described above. One or more of the processors 610, 710 and their respective memories 620, 720, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that the embodiments may further comprise a computer program product, comprising instructions which, when executed on at least one processor, e.g. the processors 610, 710, cause the at least one processor to carry out the method for enabling a relay in a radio communications network 100. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described method or the communication device, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a mobility management node for handling a GPRS Tunneling Protocol (GTP) tunnel failure in a radio communications network the method comprising:
   receiving a notification message from a Serving Gateway, SGW, serving a network node identifying at least one E-UTRAN Radio Access Bearer, E-RAB, for which a GPRS Tunneling Protocol, GTP, error indication was received;
   transmitting a release message to the network node for a wireless device associated with the network node said release message comprising information identifying the at least one E-UTRAN Radio Access Bearer, E-RAB, and information indicating that the release message was caused by a GPRS Tunneling Protocol, GTP, error indication;
   receiving a first modification message from the network node to modify the at least one E-RAB identified in the release message, said first modification message comprising the allocated one or more TEIDs for the at least one E-RAB; and
   transmitting a second modification message to the SGW to modify the at least one E-RAB identified in the received notification message, said second modification message comprising the allocated one or more TEIDs for the at least one E-RAB received in the first modification message.

2. The method of claim 1, further comprising receiving, from the network node-044 a response message comprising information indicating that the network node supports the at least one E-RAB identified in the transmitted release message and acknowledges that the release message was caused by a GTP error indication.

3. The method of claim 2, further comprising determining whether information associated with the at least one E-RAB identified in the transmitted release message need to be maintained in the mobility management node in response to the received response message.

4. The method of claim 1, wherein the release message is a UE context release command as part of an S1 release procedure and the information associated with the at least one E-RAB identified in the release message is an S1 association, and wherein the response message is a UE context release complete message as part of the S1 release procedure.

5. The method of claim 1, wherein the release message is a E-RAB release command as part of an E-RAB release procedure and the information associated with the at least one E-RAB identified in the release message is a bearer context, and wherein the response message is a E-RAB release response as part of the E-RAB release procedure.

6. The method of claim 1, wherein the first modification message is a E-RAB Modification Indication, the second modification message is a Modify Bearer request, and the notification message may be a Downlink Data Notification, DDN, message.

7. A mobility management node for handling a GPRS Tunneling Protocol (GTP) tunnel failure in a radio communications network, wherein the mobility management node comprises:
   a memory configured to store executable instructions; and
   a processor coupled to the memory, wherein the processor is configured with a receiving module and a transmitting module;
   wherein the processor is configured by the receiving module and the transmitting module to:

receive a notification message from a Serving Gateway, SGW, serving a network node identifying at least one E-UTRAN Radio Access Bearer, E-RAB, for which a GPRS Tunneling Protocol, GTP, error indication was received, transmit a release message to the network node for a wireless device associated with the network node said release message comprising information identifying the at least one E-UTRAN Radio Access Bearer, E-RAB, and information indicating that the release message was caused by a GPRS Tunneling Protocol, GTP, error indication, receive a first modification message from the network node to modify the at least one E-RAB identified in the release message, said first modification message comprising the allocated one or more TEIDs for the at least one E-RAB, and transmit a second modification message to the SGW to modify the at least one E-RAB identified in the received notification message, said second modification message comprising the allocated one or more TEIDs for the at least one E-RAB received in the first modification message.

8. The mobility management node of claim 7, further configured to receive, from the network node, a response message comprising information indicating that the network node supports the at least one E-RAB identified in the transmitted release message and acknowledges that the release message was caused by a GTP error indication.

9. The mobility management node of claim 8, further configured to determine whether information associated with the at least one E-RAB identified in the transmitted release message need to be maintained in the mobility management node in response to the received response message.

10. The mobility management node of claim 7, wherein the information associated with the at least one E-RAB identified in the release message is an Si association.

11. The mobility management node of claim 7, wherein the information associated with the at least one E-RAB identified in the release message is a bearer context.

* * * * *